United States Patent
Oh et al.

(10) Patent No.: US 7,286,739 B2
(45) Date of Patent: Oct. 23, 2007

(54) POROUS OPTICAL FIBER AND METHOD FOR MANUFACTURING THE SAME

(75) Inventors: Jeong-Hyun Oh, Daegu (KR); Young-Min Baik, Gumi-si (KR); Keun-Deok Park, Busan (KR); Soon-Jae Kim, Gumi-si (KR); Byeong-Sam Kim, Gumi-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 10/902,537

(22) Filed: Jul. 29, 2004

(65) Prior Publication Data

US 2005/0180710 A1    Aug. 18, 2005

(30) Foreign Application Priority Data

Feb. 12, 2004    (KR) .................. 10-2004-0009394

(51) Int. Cl.
*G02B 6/02*    (2006.01)
(52) U.S. Cl. .................. 385/125; 385/123; 65/385
(58) Field of Classification Search .................. 385/123
See application file for complete search history.

(56) References Cited

U.S. PATENT DOCUMENTS

| | | | |
|---|---|---|---|
| 5,071,674 A | | 12/1991 | Nogues et al. .................. 427/57 |
| 5,333,229 A | * | 7/1994 | Sayegh ........................ 385/102 |
| 2003/0147606 A1 | * | 8/2003 | Wang et al. .................. 385/123 |
| 2005/0094954 A1 | * | 5/2005 | Pickrell et al. ............. 385/123 |

FOREIGN PATENT DOCUMENTS

| | | |
|---|---|---|
| EP | 0473104 A1 | 8/1991 |
| WO | WO 02/075393 | 9/2002 |

OTHER PUBLICATIONS

Gary R. Pickrell et al.; "Random Hole Optical Fibers;" Industrial & Highway Sensors Technology, Proceedings of SPIE, vol. 5272; Oct. 28, 2003-Oct. 30, 2003; XP 002320309; 9 pgs.

D. Kominsky et al.; "Generation of Random-Hole Optical Fiber;" Optics Letters, vol. 28, No. 16; Aug. 15, 2003; XP 002320310; 3 pgs.

T. Suratwala et al.; "Control of Porosity in SiO2: PDMS Polycerams Through Variations in Sol-Gel Processing and Polymer Content;" Sol-Gel Optics IV, Proceedings of the SPIE, VI. 3136; Jul. 30, 1997-Aug. 1, 1997; XP 002320311; 12 pgs.

Gary R. Pickrell et al.; "Novel Techniques for the Fabrication of Holey Optical Fibers;" Proceedings of the SPIE, vol. 4578; Oct. 30, 2001; XP 002307454; 12 pgs.

* cited by examiner

*Primary Examiner*—Sung Pak
(74) *Attorney, Agent, or Firm*—Cha & Reiter, LLC

(57) ABSTRACT

A porous optical fiber provided with air holes and a method for manufacturing the same are disclosed. The porous optical fiber includes a core having a first refractivity extended in a longitudinal direction, an external cladding layer having a second refractivity surrounding the core, and an internal cladding layer having a third refractivity formed between the core and the external cladding layer and provided with a plurality of air holes scattered therethrough.

7 Claims, 2 Drawing Sheets

(a)

(b)

POROUS OPTICAL FIBER AND METHOD FOR MANUFACTURING THE SAME

CLAIM OF PRIORITY

This application claims priority to an application entitled "POROUS OPTICAL FIBER AND METHOD FOR MANUFACTURING THE SAME," filed in the Korean Intellectual Property Office on Feb. 12, 2004 and assigned Serial No. 2004-9394, the contents of which are hereby incorporated by reference.

BACKGROUND OF THE INVENTION

1. Field of the Invention

The present invention relates to a porous optical fiber having air holes and a method for manufacturing the same.

2. Description of the Related Art

A single mode optical fiber core is made by adding Germanium or Phosphorus to glass. As shown in FIG. 1, the porous optical fiber is made of a transparent material 1, such as fused silica glass, and uniformly spaced air holes 2 are provided through out the transparent material 1 in a longitudinal direction so that the air holes 2 are arranged in parallel with an axis of the fiber.

In a porous optical fiber, a photon transition layer is made using the difference in dielectric constants between an air layer and a silica glass layer. In the same manner as an electronic band gap in a semiconductor, such a photon transition layer has a photonic stop band against a designated wavelength or optical traveling direction. That is, only light satisfying the requirements of the photon transition layer passes through the photon transition layer. In other words, the light traveling in the porous optical fiber is achieved by a Photonic Band-gap Effect and an Effective Index Effect. This is disclosed in detail by T. A. Birks et al., Electronic Letters, Vol. 31(22) p. 1941 (October 1995) and J. C. Knight et al., Proceeding of OFC, PD 3-1 (February, 1996).

The porous optical fiber has many important technical advantages. For example, the porous optical fiber supports a single mode throughout a broad wavelength and has a large mode region, thus enabling the transmission of a signal having a high optical power and a high phase separation at a telecommunication wavelength of 1.55 µm. Further, the porous optical fiber increases/decreases the nonlinearity and thus constitutes a polarized light-regulating device. Accordingly, it is expected that the porous optical fiber having the above-described characteristics will be widely applied to optical communication fields.

In the conventional techniques of manufacturing a preform for the porous optical fiber, capillary glass tubes and glass rods are stacked and bound into a bundle having a desired shape to produce a preform. However, the conventional techniques require workers to assemble the elements into the perform manually which tend to generate contaminants during the manufacturing process and require a repetitive washing step.

Since capillary glass tubes and the glass rods are stacked and bound into the bundle, the arrangement of air holes in a hexagonal shape in the preform is simple. However, when the porous optical fiber having a porous structure is drawn from the preform, since tubular members disposed at the outside area of the preform melt faster than the tubular members disposed at the inside area of the preform due to a difference of heat conductivity between the inside and outside areas of the preform, air holes disposed at the outside area of the preform are remarkably reduced or clogged as opposed to air holes disposed at the inside area of the preform. As a result, the comparatively large-sized inside air holes tend to deform into oval shapes. This deformation of air holes, generated when the porous optical fiber is drawn from the preform, causes many difficulties in continuously manufacturing a large amount of the porous optical fiber continuously.

SUMMARY OF THE INVENTION

Therefore, the present invention has been made in view of the above problems and provides additional advantages, by providing a method of manufacturing a porous optical fiber to prevent the contamination of the porous optical fiber and simplifies the process of stacking glass tubes and rods.

In accordance with one aspect of the present invention, a porous optical fiber includes: a core having a first refractivity extended in a longitudinal direction; an external cladding layer having a second refractivity surrounding the core; and an internal cladding layer having a third refractivity formed between the core and the external cladding layer and provided with a plurality of air holes scattered therethrough.

Preferably, the air holes may be irregularly scattered.

Further, the core and the external cladding layer may be made of silica glass, and the internal cladding layer may be made of silica glass provided with a plurality of the air holes.

More preferably, the first refractivity may be higher than the second or third refractivity.

In accordance with another aspect of the present invention, a method for manufacturing a porous optical fiber includes the steps of: (a) preparing a tubular mold including an external tube, an internal tube, and a central rod; (b) pouring a slurry containing amorphous silica particles into the external tube and gelling the slurry to produce an external cladding layer; (c) pouring a slurry containing a bubble forming material into a space between the external cladding layer and the central rod to form bubbles by means of subsequent thermal treatment, and molding the slurry to produce an internal cladding layer; (d) removing the central rod from the mold, pouring a core material into the removed area of the central rod, and gelling the core material to produce a core; and (e) thermally treating a preform for the porous optical fiber, obtained by the steps (a) to (d), and drawing the porous optical fiber from the preform.

Preferably, optical characteristics of the porous optical fiber may be regulated by the amount of the bubble forming material.

BRIEF DESCRIPTION OF THE DRAWINGS

The above features and other advantages of the present invention will be more clearly understood from the following detailed description taken in conjunction with the accompanying drawings, in which.

DETAILED DESCRIPTION

Now, embodiments of the present invention will be described in detail with reference to the annexed drawings. For the purposes of clarity and simplicity, a detailed description of known functions and configurations incorporated herein will be omitted as it may make the subject matter of the present invention unclear.

First, a porous optical fiber and a method of manufacturing the same in accordance with the teachings of the present invention are characterized in that optical transmission is achieved by the same total reflection of internal and external cladding layers rather than the modified total internal reflection of an internal layer generated due to a regular arrangement of air holes formed in a conventional optical fiber.

Figure 1:
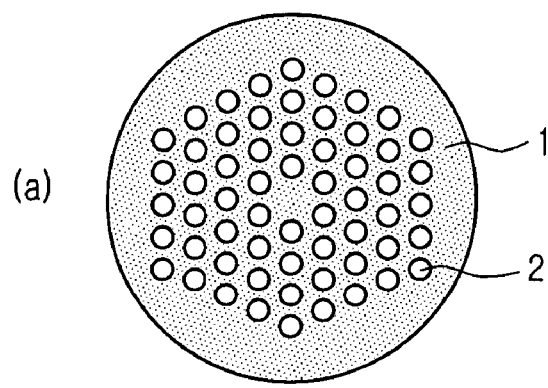
FIG. 1a is a sectional view illustrating the structure of a conventional porous optical fiber.
FIG. 1b is a schematic view illustrating the distribution of a refractivity in the conventional porous optical fiber.
Figure 1:
Figure 2:
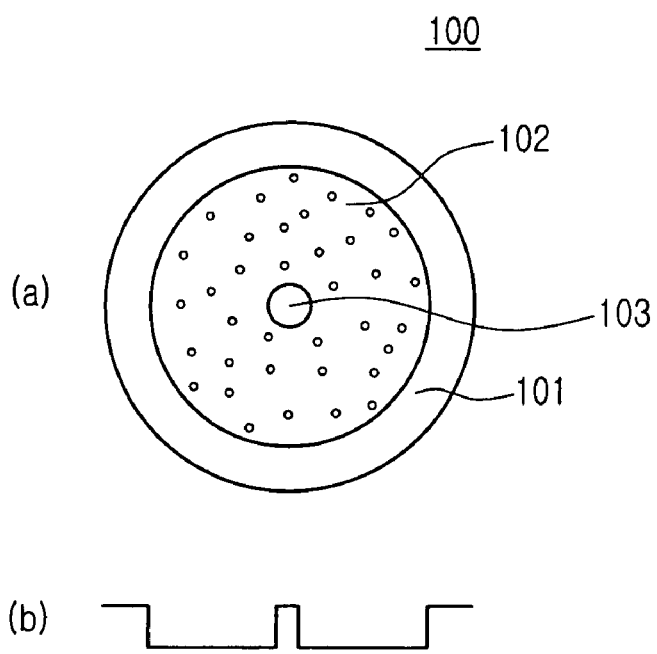
FIG. 2a is a sectional view illustrating the structure of a porous optical fiber in accordance with the present invention.
FIG. 2b is a schematic view illustrating the distribution of a refractivity of the porous optical fiber in accordance with the present invention.

FIG. 2a illustrates the structure of a porous optical fiber in accordance with the present invention, and FIG. 2b illustrates the distribution of a refractivity of the porous optical fiber in accordance with the present invention. As shown in FIG. 2a, the porous optical fiber 100 of the present invention includes an external cladding layer 101 made of silica glass without air holes, a cladding layer 102 made of silica glass provided with irregularly scattered air holes, and a core 103 made of silica glass without air holes.

The cladding layer 102 is provided with the air holes irregularly distributed therein, thus not having characteristics of a photon band gap. Since the air holes of the cladding layer 102 have a comparatively high volume, the average refractivity of the cladding layer 102 is lower than that of the core 103, thereby allowing light to be guided by the core 103 (with reference to FIG. 2b).

Figure 3:
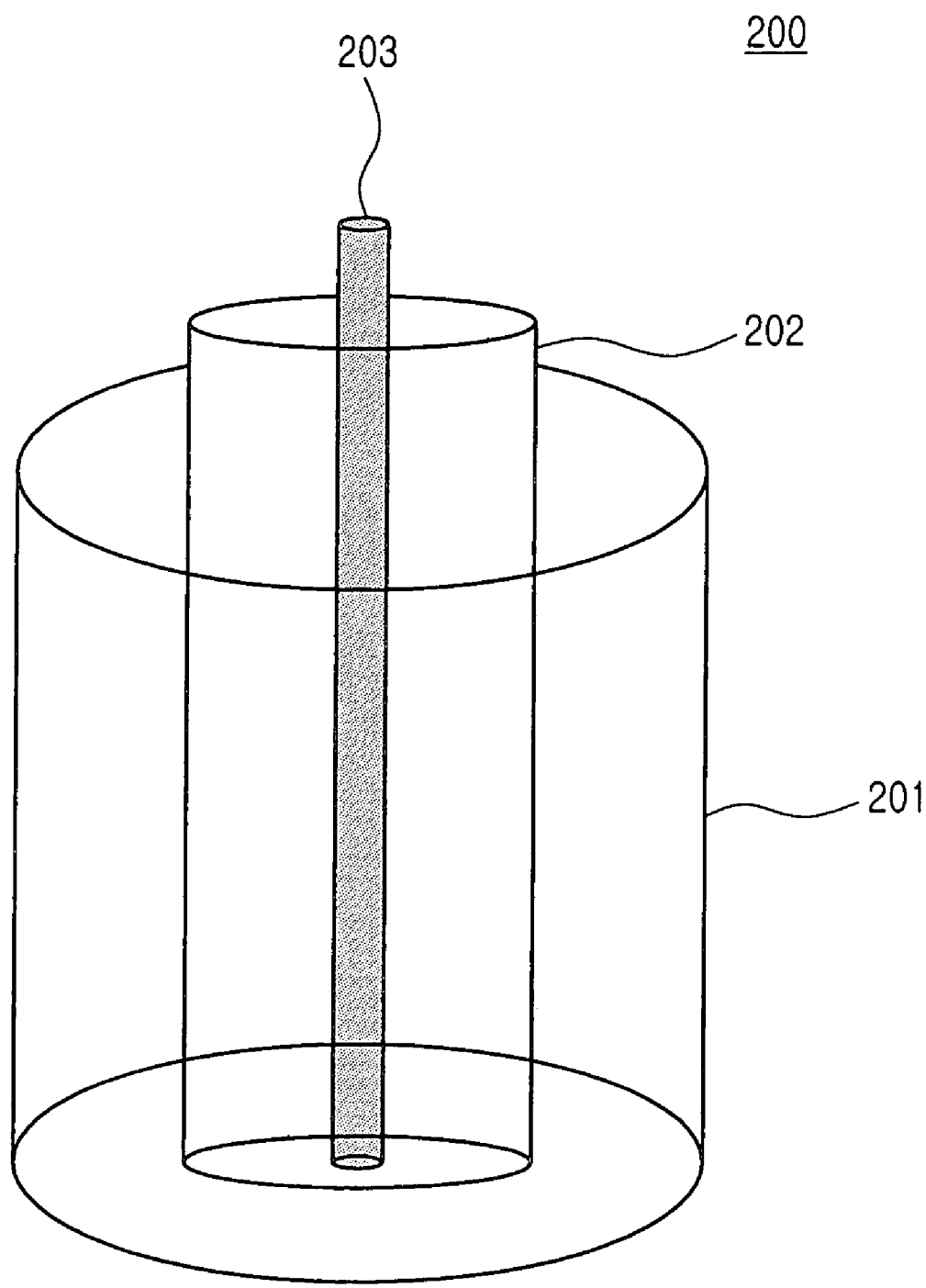
FIG. 3 is a perspective view of a mold for manufacturing the porous optical fiber in accordance with the present invention.

FIG. 3 is a schematic perspective view of a mold for manufacturing the porous optical fiber in accordance with the present invention which comprises three steps.

In the first step, a tubular mold having a desired size is prepared. In particular, the tubular mold includes an external tube 201, an internal tube 202, and a central rod 203. The rod 203 is disposed at the central area of the internal tube 202. A slurry containing amorphous silica particles is poured into the mold, and is then gelled, thus producing the outermost layer. Here, vacuum is applied to the slurry containing the amorphous silica particles so that bubbles are not generated in the slurry. After the slurry without bubbles is poured into the mold and gelled, the external tube 201 is removed from the mold.

In the second step, a slurry, containing a bubble forming material for forming bubbles therein by subsequent thermal treatment, is poured into a space between the formed outermost layer obtained by the first step and the central rod 203, and is then molded. The bubble forming material is one selected from the group consisting of an organic bubble forming agent and various oils, being water insoluble, for forming an emulsion, and an amount of the bubble forming material added to the silica slurry is 1~50% of the total amount of the silica slurry. That is, oil or polymer particles are added and dispersed into the silica slurry to form the air holes, and the added oil or polymer particles are burned in the thermal treatment, thereby forming the air holes in the silica slurry.

In the third step, the central rod 203 is removed from the mold, and then the silica slurry, the same as the silica slurry used in the first step, is poured into the mold and is gelled. After the gelation of the silica slurry is completed, the obtained gel is separated from the mold, and is then dried. The obtained dry gel formed into a cylindrical shape is thermally treated and vitrified, thereby creating a porous optical fiber provided with scattered air holes. That is, in order to draw the porous optical fiber from the obtained preform in a dry gel state, the preform is heated to a high temperature, thereby creating bubbles formed therein. The density of the bubbles can be uniformly maintained through the optical fiber. Further, since the porous optical fiber is made of silica powder, all types of compound can be added to the fiber. While the conventional porous optical fiber represents various optical characteristics based on size, number, and arrangement of air holes formed therein, the porous optical fiber of the present invention regulates various optical characteristics based on the amount of bubble forming materials (oil, polymer, etc.) added to the slurry when the cladding layers are formed.

As apparent from the above description, the present invention provides a porous optical fiber and a method for manufacturing the same, in which air holes are formed in a cladding layer, thereby simplifying a process for manufacturing the porous optical fiber.

Further, in accordance with the present invention, it is possible to manufacture a large-sized preform without the probability of contamination and to allow the porous optical fiber to have various optical characteristics based on the amount of a bubble forming material added to the slurry when cladding layers are formed.

Although preferred embodiments of the present invention have been described in detail, those skilled in the art will appreciate that various modifications, additions, and substitutions to the specific elements are possible, without departing from the scope and spirit of the invention as disclosed in the accompanying claims.

What is claimed is:

1. A method for manufacturing a porous optical fiber comprising the steps of:
    (a) preparing a tubular mold including an external tube, an internal tube, and a central rod;
    (b) pouring a slurry containing amorphous silica particles into the external tube and gelling the slurry to produce an external cladding layer;
    (c) pouring a slurry containing a bubble forming material into a space between the external cladding layer and the central rod to form bubbles by means of a subsequent thermal treatment, and molding the slurry to produce an internal cladding layer;
    (d) removing the central rod from the mold, pouring a core material into the removed area of the central rod, and gelling the core material to produce a core; and
    (e) thermally treating a preform for the porous optical fiber, obtained by the steps (a) to (d), and drawing the porous optical fiber from the preform.

2. The method as set forth in claim 1, wherein the step(b) further includes the step of applying vacuum to the slurry containing the amorphous silica particles so that bubbles are not generated in the slurry, and removing the external tube.

3. The method as set forth in claim 1, wherein optical characteristics of the porous optical fiber are regulated by the amount of the bubble forming material.

4. The method as set forth in claim 1, wherein an amount of the bubble forming material added to the silica slurry in step (c) ranges between 1~50% of the total amount of the silica slurry produced in step (b).

5. The method as set forth in claim 1, wherein the bubble forming material in the step (c) is one selected from the group consisting of an organic bubble forming agent and various oils, being water insoluble, for forming an emulsion.

6. The method as set forth in claim 1, wherein the core material in the step (d) is the same material as the slurry for producing the external cladding layer in the step (b).

7. The method as set forth in claim 1, wherein the tubular mold has a predetermined shape.

* * * * *